United States Patent [19]

Ishiguro et al.

[11] 4,336,636
[45] Jun. 29, 1982

[54] FASTENING DEVICE

[76] Inventors: Yoshihiko Ishiguro; Keiko Ishiguro, both of 9-5 Minamikyutaro-cho 4-chome; Hiromi Shiotani, 9, Ryuzoji-cho, all of Higashi-ku, Osaka-shi, Osaka-fu, Japan

[21] Appl. No.: 116,830

[22] Filed: Jan. 30, 1980

[30] Foreign Application Priority Data

Jan. 30, 1979 [JP] Japan .................................... 54-9815

[51] Int. Cl.³ ...................... F16G 11/04; F16G 11/00; A44B 11/10
[52] U.S. Cl. .................................. 24/115 M; 24/117; 24/136 K; 24/171; 24/196; 24/309
[58] Field of Search ............ 24/115 M, 115 L, 136 R, 24/136 K, 136 A, 136 L, 117, 74 R, 196, 68 SK, 68 E, 69 SK, 73 GC, 171; 403/211

[56] References Cited

U.S. PATENT DOCUMENTS 3,758,922 9/1973 Field .............................. 24/115 M Primary Examiner—Alexander Grosz
Attorney, Agent, or Firm—Wenderoth, Lind & Ponack

[57] ABSTRACT

A fastening device is structured so that one half thereof is symmetrical with the other and includes a casing, with a pair of inwardly folded portions, and a pair of symmetrical block-members, each having a bar-member and accommodated within the casing such that one end of each block-member is respectively outwardly biased toward the lateral open ends of the casing. Respective end portions of strings or the like are wound around the respective bar-member and respectively abut the respective folded portions as long as the respective ends of the block-members remain outwardly biased and are not pushed inwardly by a user.

13 Claims, 9 Drawing Figures

FASTENING DEVICE

BACKGROUND OF THE INVENTION

This invention relates to a fastening device for fastening strings associated with an object thereby holding the object firmly in position.

Presently, there have been many clasping devices or buckles for fastening or clasping strings, straps or the like to be used, for example, with shoes, underwear, trousers, seaside wear, neckties or the like. However, these conventional clasping devices or buckles often inherently have defects such that they can not be easily released in a handy manner. Moreover, according to these conventional clasping devices or buckles, once the objects associated therewith having been fastened in position, the strings or the like are apt to be gradually released or loosened due to use of the object.

In view of the defects inherent in the conventional clasping devices or buckles as described above, the present invention comprehends a fastening device, which can be used for effectively fastening strings or the like so as to hold objects associated therewith in position, and the device is also capable of functioning in a handy manner, while substantially eliminating the above-described defect of a gradual loosening of the strings or the like due to use of the object.

SUMMARY OF THE INVENTION

Accordingly, an essential object of the present invention is to provide a fastening device for fastening strings or the like thereby holding an object associated therewith in position and for unfastening the strings in a handy manner, while eliminating the drawbacks of gradual string loosening during use of the object.

Another object of the present invention is to provide a fastening device of the above-described type, which is simple in construction and highly efficient in use.

A further object of the present invention is to provide a fastening device of the above-described type, which can be manufactured at low cost.

In accomplishing these and other objects according to one preferred embodiment of the present invention, a fastening device is so structured that one half thereof is symmetrical with the other half, and the device comprises a casing having a substantially rectangular cross-section, a pair of block members which are accommodated inside the casing so that the respective outer ends of the block members are outwardly biased whereby they respectively project from the longitudinal sides of the casing and a resilient spring member, which is interposed between the block members, thereby outwardly biasing the block members.

The casing has two longitudinal opposing sides. The two longitudinal edges of each longitudinal side are folded inwardly at substantially right angles thereby forming four longitudinal edge portions. Also, the casing has respective open ends at the respective substantially lateral ends thereof, a plurality of second apertures, and a central bore through one longitudinal side thereof, a pair of first apertures through the other longitudinal side thereof and each positioned on either side of the axis of the central bore.

Furthermore, on the top face or the one longitudinal side thereof, respective portions of the casing, each partially defining the peripheral boundary of the central bore are peeled or partially folded downwardly thereby providing respective, engaging portions which engage a string or the like. A surface of each engaging portion is preferably made frictional.

Furthermore, each block member has a second opening through its top face, a first opening through its bottom face, and a chamber therebetween. The corresponding first and second apertures communicate via the first and second openings and the chamber. Also, each block has a cylindrical bar, which is arranged to be longitudinally extended in the direction transverse to the longitudinal axis of the casing, a shoulder, having a height sufficient to allow it to be projected from the central bore of the casing when the block member is positioned inside the casing, and a round recessed portion, located on a substantially leading side wall that faces the opposing block, for receiving the spring member, which, in cooperation with the other recessed portion of the other block member, fixes the spring member in a position between the two block members. The relative spacing of the cylindrical bar with respect to the engaging portion of the casing is determined so that a string wound around the cylinder bar is normally engaged with the circumference of the engaging portion when the string is in a fastened state. Furthermore, the shoulder is provided with a through passage.

According to the device as described above, one leading end of the string is first introduced into the chamber, through the first aperture of the casing and the first opening of the block member, and is then wound around the cylindrical bar. Then, the leading end of the string is passed through a channel, defined by the space between the cylindrical bar and the engaging portion and is extended through the corresponding second aperture via the second opening. A leading end of the other string is similarly passed through the casing and the other block member as described above.

By this arrangement, when a user manipulates the device in a manner such that the end portions of each block member, which normally project from the respective open sides of the casing, are inwardly accommodated against the resilient force of the spring, the strings, each having been urged towards the engaging portion are released from the engaged state. Accordingly, the string can be loosened or further fastened in the drawing direction of the both end portions of the string.

As is clear from the foregoing description, the fastening device of the present invention allows a user to permit the strings to be fastened, thereby fixing an object associated therewith, and allows a user, by a simple manipulation of the block members, to loosen the strings, thereby freeing an object associated therewith. However, the fastening device according to the present invention functions to substantially prevent accidental or gradual loosening of the strings during use of the object associated therewith.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Referring now to FIG. 1 to FIG. 4, there is shown one preferred embodiment of a fastening device according to the present invention. As is evident from FIG. 1 to FIG. 3, this embodiment is so arranged that the halves are symmetrical in construction. Therefore, for the sake of brevity, the characteristic construction of this embodiment is only described with reference to the one half.

Figure 3:
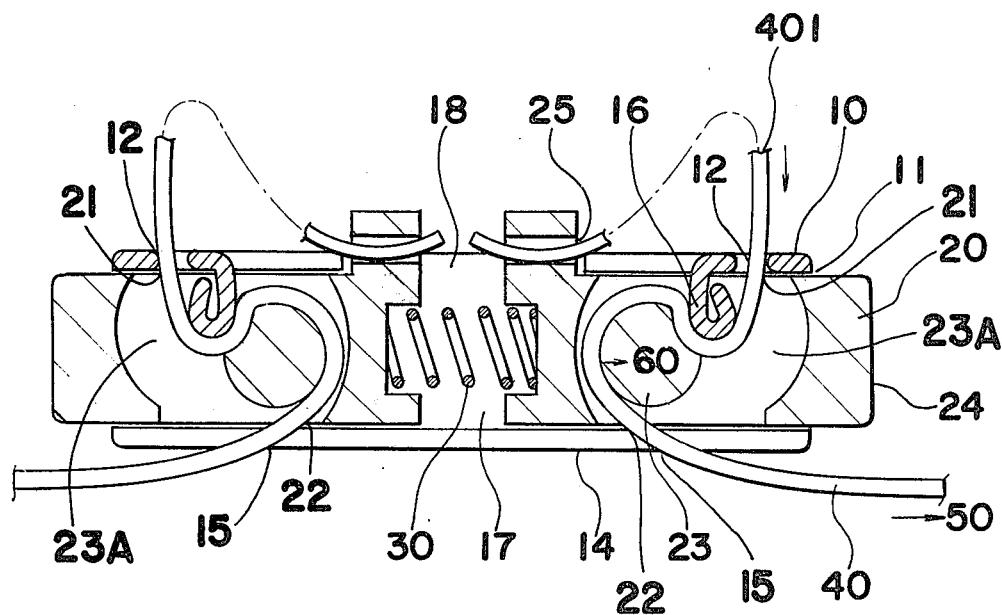
FIG. 3 is a cross sectional view of the embodiment of FIG. 1.
Figure 4:
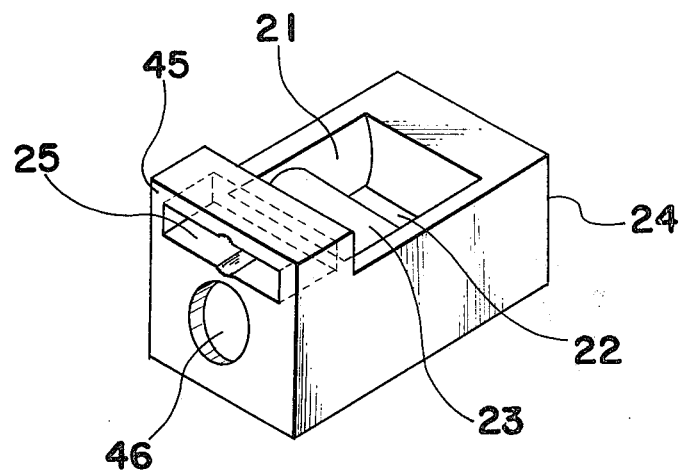
FIG. 4 is a perspective view of a block member to be incorporated in the embodiment of FIG. 1.

The fastening device of the present invention comprises a casing or frame member 10, a pair of block members 20, symmetrically accommodated in the frame member 10, and a coil-spring 30 interposed between the block members 20 and disposed in a resilient state. More specifically, the frame member 10 is a casing made of plated metallic plates or the like and has a substantially square or rectangular cross section, and has lateral open ends 11. The casing also has two longitudinal opposing sides 13 and four longitudinal edge portions 14 formed by folding inwardly the longitudinal edges of the two longitudinal sides 13. Also, the frame member 10 has a central bore 18, two second apertures 12 through a top face, or a longitudinal side 13, and two first apertures 15 through the bottom face or a longitudinal side 13 of the casing or the frame member 10. On the top face of the casing 10, a portion of the frame member 10 is folded downwardly, thereby providing an engaging portion 16 for engaging a string or the like. As far as the engaging portion 16 is concerned, a bar member having ends which are supported by each side wall 13 of the casing 10 could be utilized instead of the structure of the engaging portion 16 as described above. A surface of the engaging portion 16 is preferably provided with a substantially frictional portion which can be formed by recessing the surface which engages a string 40 or the like when in use. Each block member 20 has a second opening 21 through its top face, a first opening 22 through its bottom face which communicates with the second opening 21 through a chamber within the member, a cylindrical bar 23 with which the string 40 or the like is tightly engaged therearound. The cylindrical bar 23 is arranged to be laterally extended across the chamber while being supported by respective side walls which partially define the chamber mentioned above. The block member includes a shoulder 45 at one end portion of the top face, which has a passage 25 of a rectangular cross section which is transversely extended in the longitudinal direction with respect to the longitudinal axis of the block member, and a round recessed portion 46, which is located on a substantial leading side wall for receiving one end of spring 30 and which cooperates with the other recessed portion of the other block member fixed to the spring 30 when these two are assembled in the frame member 10. As shown in FIGS. 3 and 4, the block member 20 is substantially square shaped. Each end portion 24 of the members 20 projects outwardly by a predetermined length when the block members 20 are accommodated in respective positions inside the casing 10 with coil-spring 30 being interposed between the members 20. Moreover, upon assembling of the member 20 inside the member 10, each cylindrical bar 23 is arranged to be disposed relatively opposite of each end portion 24 with engaging portion 16 positioned therebetween as shown in FIG. 3. As far as the outer circumferential configuration of the cylindrical bar 23 is concerned, a portion abutting the engaging portion 16 is preferably provided with a skid-proof portion by providing the abutting portion with a number of small recesses, projections, or ripples, or the like. As described previously, the spring, coil or resilient member 30 is disposed in a space 17 inside the casing 10 and is interposed between respective roundedly recessed portions 46 respectively provided in each block member 20 in a manner such that each end portion 24 of the paired block members 20 are accommodated inside the casing 10 and are respectively biased toward each free open end 11.

Figure 1:
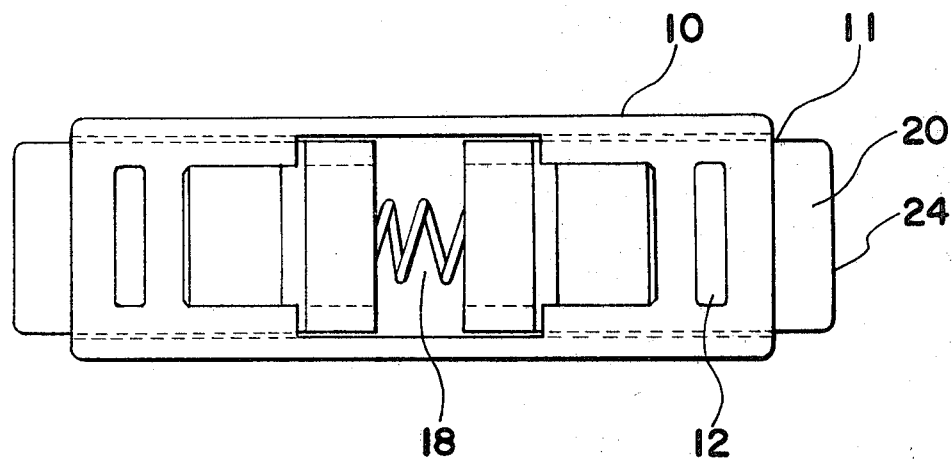
FIG. 1 is a top plan view of one embodiment of fastening devices according to the present invention.
Figure 2:
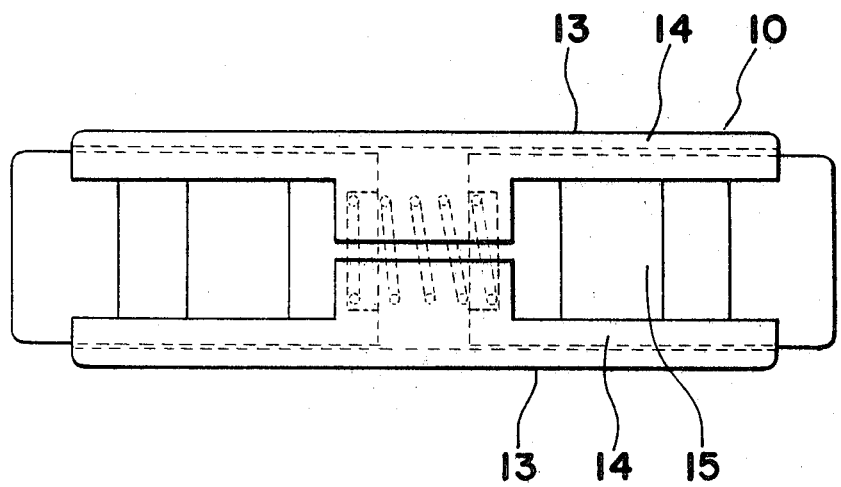
FIG. 2 is a rear view of the embodiment of FIG. 1.

Accordingly, when the device is assembled in the unit as shown in FIGS. 1 to 3, a leading end portion 401 of the string 40 or the like is first threaded through the corresponding first aperture 15 and the first opening 22 and into the chamber 23A communicating with the first opening 22 (see FIG. 2 and FIG. 4), and then it is partially wound around the cylindrical bar 23. Then, the leading end wound around the cylindrical bar 23 is passed through a channel defined by the outer circumference of the cylindrical bar 23 and an outer circumference of the engaging portion 16 and is then, threaded through the second opening 21 and the second aperture 12 before being passed through the passage 25. As far as the materials for respective members are concerned, the block member 20 is preferably manufactured by a resin molding process, and the frame member 10 is manufactured by a sheet metal working process.

Figure 5:
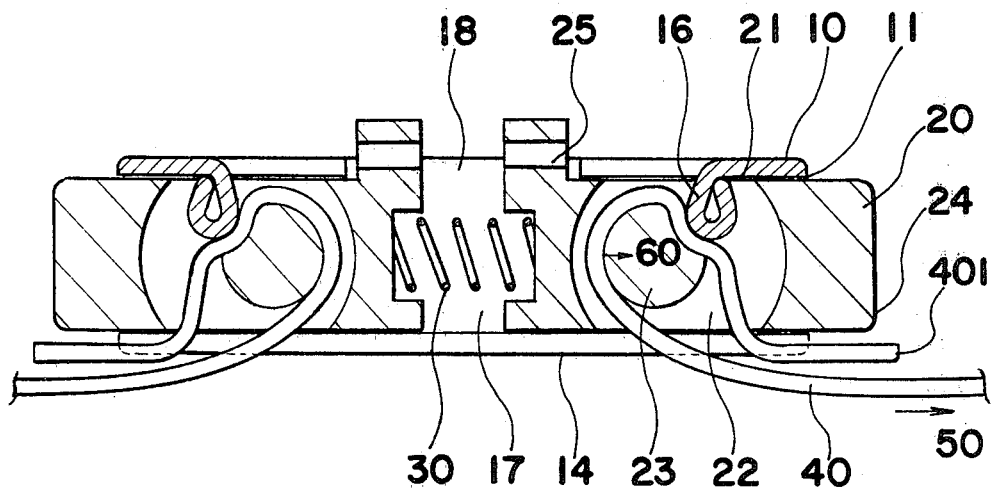
FIG. 5 is a cross sectional view of a first modified form of the embodiment shown in FIG. 3.

Referring now to FIG. 5, there is shown a first modified embodiment of the fastening device according to the present invention. Like the former embodiment, this modified embodiment is also so arranged that one block member 20 is symmetrical with the other block member 20 in respect to its structional configuration. Therefore, for the sake of brevity, the characteristic construction of this modified embodiment is also only detailed with reference to one of the block members 20. However, as can be seen from both embodiments as shown in FIGS. 1 and 5, this modified embodiment is only substantially different from the former embodiment in that the string or the like is arranged to be engaged with the device in a different manner as will be described hereinbelow.

According to this modified embodiment, the leading end portion 401 of the string 40 is first introduced into the above-described chamber via the corresponding first aperture 15 (see FIG. 2) and the first opening 22 (see FIG. 4) and then is partially wound around the cylindrical bar 23. The leading end after being around the cylindrical bar 23 is then passed through the above-described channel and then is threaded through the corresponding second aperture 12 via the second opening 21.

According to the above-described embodiments of the present invention, when a user manipulates the device in a manner such that the end portion 24, which is normally outwardly projected from the open end 11, is inwardly disposed against a resilient force, caused either by the resiliency specific to the string 40 or the combined resiliency specific to the combination of the string 40 and the resilient member 30, the string 40 which is normally biased towards the engaging portion 16 and abutting the cylindrical bar 23 is set free from its engaged state. Accordingly, the string 40 is in a freely movable state, as long as the above-described manipulation is maintained, whereby the string 40 can be loosened or further fastened in the drawing direction of the string 40. More specifically, if the string end 401 or the string 40 is drawn in a direction indicated by an arrow 50 as shown in FIGS. 3 and 5, the string 40 associated with an object (not shown) is loosened. On the other hand, if the string 40 is drawn in the reverse direction relative to the above-described direction, the string 40 is further fastened. If the above-described manipulation causing the inward disposition of the end portion 24 is discontinued, the block member 20 is outwardly biased by the resilient force caused by the resilient member 30. Accordingly, the string 40 is again urged towards the engaging portion 16 and abuts the cylindrical bar 23 thereby fastening the string 40 in position.

It is to be noted here that the resilient member 30 as described in relation to these embodiments is not compulsory and thereby can be omitted. If this is the case and the string 40 is drawn in the direction denoted by the arrow 50, the string 40 itself is urged towards the engaging portion 16 and abuts the cylindrical bar 23.

Figure 6:
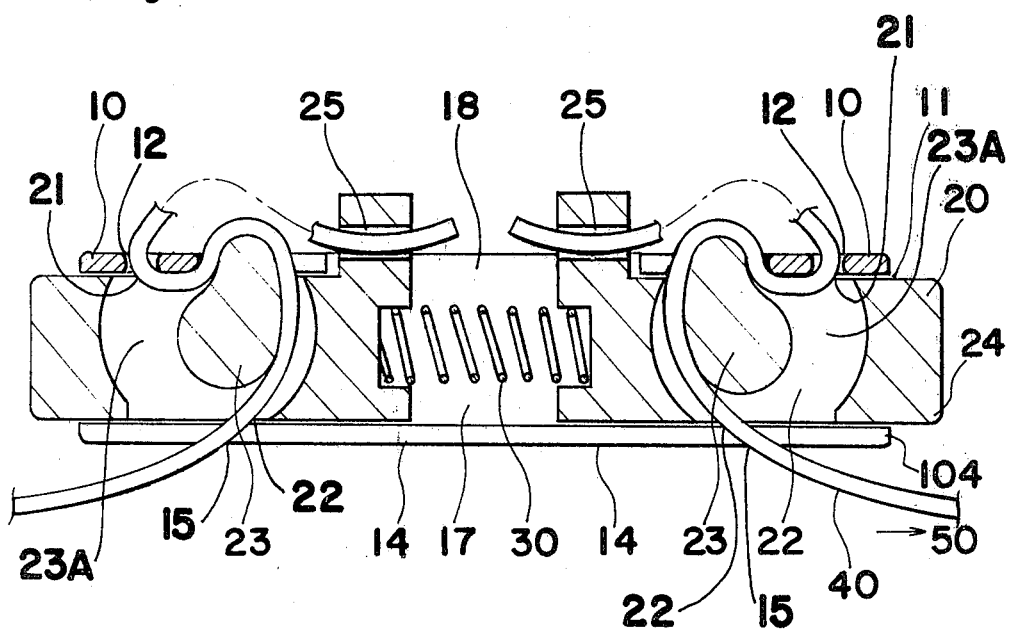
FIG. 6 is a cross sectional view of a second modified form of the embodiment shown in FIG. 3.

Referring now to FIG. 6, there is shown a second modified embodiment according to the present invention. According to this modified embodiment, the engaging portion 16 is omitted and the cylindrical bar 23 is arranged to have a specific cross sectional shape as shown in FIG. 6, thereby causing the string 40 to be positioned in a fastened state without the inclusion of the engaging portion 16. More specifically, the cylindrical bar 23 is arranged to have a radial cross-sectional shape such that its top portion projects from the central bore 18, resulting in the projected portion abutting the periphery of the central bore 18 whereby the periphery of the central bore 18 can seize the string 40 when it is wound around the bar 23 and the frame member 10, the block members 20, and the cylindrical bar 23 of each respective block member 20 of the above-described type are assembled in the unit.

Figure 7:
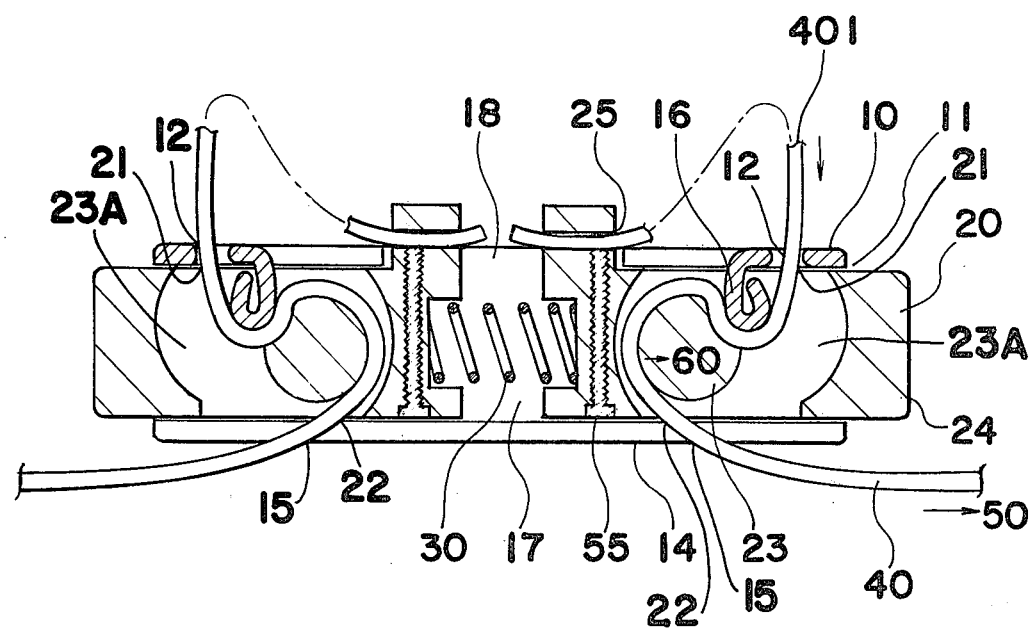
FIG. 7 is a cross sectional view of a third modified form of the embodiment shown in FIG. 3.
Figure 8A:
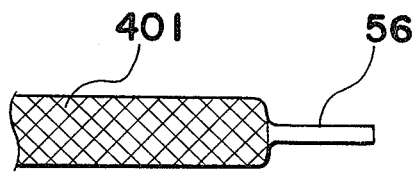
FIGS. 8(a) and 8(b) are typical strings or the like to be used for the embodiment shown in FIG. 7.
Figure 8B:
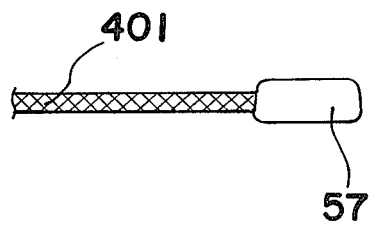

Referring now to FIG. 7, there is shown a third modified embodiment according to the present invention, wherein strings 40, each being of the type as shown in FIG. 8(a) or in FIG. 8(b), are each arranged to be firmly fixed in a position inside the passage 25 by means of threaded shanks or screws 55. This embodiment is preferably employed for use with shoes as the object to be fixed. According to this embodiment, the leading end 401 of the string is normally fixed in the position as described above, whereby one can fix or release an object associated with this device without being concerned with the leading ends of the string, which can be quite an annoying matter. In order to effectively fasten the strings of the above-described type, each of the leading ends of the strings is specifically threaded in advance and is provided with either metallic caps or plastic caps 56 and 57 as specifically shown in FIGS. 8(a) and 8(b). However, if a more favorable appearance is of no concern, the above-described metallic or plastic caps are not required and the aforementioned fastening can be simply accomplished by tying both ends 401 of the string.

Figure 9:
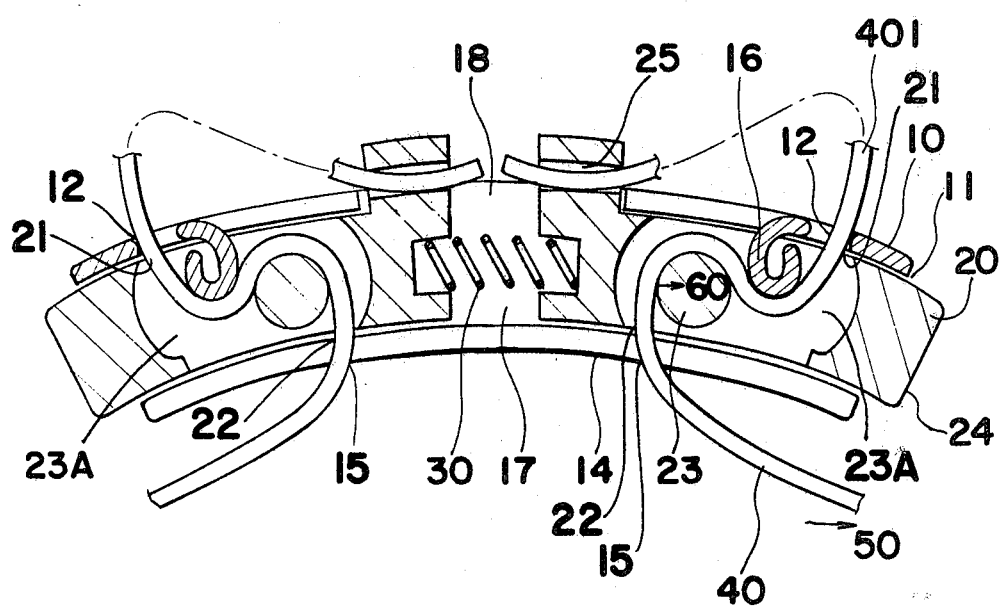
FIG. 9 is a cross sectional view of a fourth modified form of the embodiment shown in FIG. 3.

Referring now to FIG. 9, there is shown a fourth modified embodiment according to the present invention, wherein the fastening device itself is structured so as to be longitudinally curvilinear based upon a predetermined radius of curvature with respect to the bottom face of the casing. Therefore, the fastening device is curved as shown in FIG. 9. The radius of curvature is determined with regard to the specific object that is associated therewith. By this arrangement as described above, the fastening device is easily mounted on the object to be associated therewith without the formation of a crevice or clearance between the device and the associated object.

As described previously, all of the block members of the embodiments according to the present invention are made of a plastic and are manufactured by a resin molding process, and all of the frame members of the embodiments according to the present invention are made of a metallic material such as aluminum, plated iron, stainless steel or the like and are manufactured by a sheet metal working process.

As is clear from the description in the foregoing, the fastening device of the present invention allows a user to utilize strings associated with an object whereby the strings can be fastened and released in quite an effective manner with a simple manipulation as described earlier, while excluding any undesirable gradual unfastening or loosening of the strings when an object associated therewith is in use.

Although the present invention has been fully described by way of example with reference to the accompanying drawings, it is to be noted herein that various changes and modifications are apparent to those skilled in the art. Therefore, unless such changes and modifications depart from the scope of the present invention, they should be construed as included therein.

What is claimed is:

1. A fastening device to be used with an object having at least one string which fixes the string in position in relation to an object when the string is affixed by the fastening device, said device comprising:
   a casing having a first and second longitudinal sides and having two lateral open ends, said longitudinal sides being oppositely positioned with respect to one another;
   said first longitudinal side having a central bore through the center thereof;
   said second longitudinal side having two first apertures therethrough, each of said first apertures being respectively positioned between the axis of said central bore and one of said lateral open ends;
   a pair of block members, said block members being oppositely slidably positioned within said casing and respectively having end portions which respectively project from said lateral open ends;
   each of said block members having a chamber therein and having a first opening therein which communicates with said chamber, said first opening being substantially aligned with one of said first apertures and communicating therewith;
   said block members having two bar members respectively fixedly positioned in said chamber of each of said blocks, each of said bar members extending in a direction substantially transverse to the longitudinal direction of said casing, each of said block members having a shoulder extending outwardly from said central bore for abutting the outer periphery of said central bore for limiting outward movement of the corresponding block member with respect to said casing;

a biasing means positioned within said casing for biasing said block members away from one another; and said first longitudinal side having two inwardly projecting engaging portions, each of said engaging portions being respectively operatively associated with a corresponding one of said bar members for, when said block members are biased by said biasing means, abutting and affixing a corresponding string, threaded through one of said first apertures and said first opening associated with a corresponding one of said block members and wound at least partially around the associated one of said bar members, against the associated said one of said bar members and thereby preventing the corresponding string from substantial movement in the longitudinal direction thereof with respect to the corresponding block member and thereby fixing the string in position in relation to the object.

2. A fastening device as claimed in claim 1, further comprising:

each of said block members having a recessed portion, the recessed portions of said block members being opposed and aligned; and said biasing means being a spring positioned between and abutting said recessed portion of each of said block members.

3. A fastening device as claimed in claim 1, wherein: said first longitudinal side further has two second apertures therethrough, each of said second apertures being respectively positioned between said central bore and one of said lateral open ends;

each of said block members further has a second opening which communicates with said chamber and which is substantially aligned with a respective one of said two second apertures and communicates therewith; and said shoulder of a corresponding block member has a passage therethrough extending in a direction substantially parallel to the longitudinal axis of said casing for, when the corresponding string is threaded through said second opening and the aligned one of said second apertures, threading the corresponding string therethrough.

4. A fastening device as claimed in claim 3, further comprising a threaded shank through said shoulder of each of said block members, said threaded shank transversely threadably extending into and out of said passage of the corresponding block member for, when the corresponding string is threaded through the corresponding passage and the corresponding threaded shank is extended into the corresponding passage such that it abuts the corresponding string, fixing the corresponding string with respect to the corresponding passage.

5. A fastening device as claimed in claim 1, wherein the portion of the outer periphery of each of said bar members that abuts the corresponding string is roughened.

6. A fastening device as claimed in claim 1, wherein said fastening device is longitudinally curvilinear.

7. A fastening device as claimed in claim 1, wherein said block members are symmetrical in construction.

8. A fastening device to be used with an object having at least one string which fixes the object in position when it is affixed by the fastening device, said device comprising:

a casing having a first and second longitudinal sides and having two lateral open ends, said longitudinal sides being oppositely positioned with respect to one another;

said first longitudinal side having a central bore through the center thereof;

said second longitudinal side having two first apertures therethrough, each of said first apertures being respectively positioned between the axis of said central bore and one of said lateral open ends;

said first longitudinal side having two second apertures therethrough, each of said second apertures being respectively positioned between said central bore and one of said lateral ends;

a pair of block members, said block members being oppositely slidably positioned within said casing and respectively having end portions which respectively project from said lateral open ends;

each of said block members having a chamber therein and having a first and second opening therein which communicate with said chamber, said first opening being substantially aligned with one of said first apertures and communicating therewith, said second opening being substantially aligned with one of said second apertures and communicating therewith;

a biasing means positioned within said casing for biasing said block members away from one another;

said block members having two bar members respectively fixedly positioned in said chamber of each of said block members, each of said bar members extending in a direction substantially transverse to the longitudinal direction of said casing, each of said block members having a shoulder extending outwardly from said central bore for abutting the outer periphery of said central bore for limiting outward movement of the corresponding block member with respect to said casing;

each of said bar members having an elongated cross-sectional configuration and arranged within the corresponding chamber so that a radial portion thereof outwardly projects from said central bore for, when said block members are biased by said biasing means, affixing a corresponding string, threaded through one of said first apertures and said first opening associated with a corresponding one of said block members and wound at least partially around the associated one of said bar members, against an outer periphery of said central bore and thereby preventing the corresponding string from substantial movement in the longitudinal direction thereof with respect to the corresponding block member and thereby affixing the string in position in relation to the object.

9. A fastening device as claimed in claim 8, wherein: each of said block members further has a recessed portion, the recessed portion of each of said block members being opposed and aligned with respect to the other; and said biasing means being a spring positioned between and abutting said recessed portion of each of said block members.

10. A fastening device as claimed in claim 8, wherein said shoulder of a corresponding block member has a passage therethrough extending in a direction substantially parallel to the longitudinal axis of said casing for, when the corresponding string is threaded through said second opening and the aligned one of said second apertures, threading the corresponding string therethrough.

11. A fastening device as claimed in claim 10, further comprising a threaded shank through said shoulder of each of said block members, said threaded shank transversely threadably extends into and out of said passage of the corresponding block member for, when the corresponding string is threaded through the corresponding passage and the corresponding threaded shank is extended into the corresponding passage such that it abuts the corresponding string, fixing the corresponding string with respect to the corresponding passage.

12. A fastening device as claimed in claim 8, wherein the portion of the outer periphery of each of said bar members that abuts the corresponding string is roughened.

13. A fastening device as claimed in claim 8 wherein said fastening device is longitudinally curvilinear.

* * * * *